United States Patent [19]

Morine et al.

[11] 3,760,989
[45] Sept. 25, 1973

[54] APPARATUS FOR DISPENSING A PLURALITY OF DISCRETE QUANTITIES OF FLUENT MATERIAL

[76] Inventors: Richard L. Morine, 8202 Concord Dr., Menton, Ohio 44060; James J. Hokes, 1531 Wagar Ave., Lakewood, Ohio 44107

[22] Filed: Mar. 31, 1972

[21] Appl. No.: 240,223

Related U.S. Application Data

[62] Division of Ser. No. 128,805, March 29, 1971, Pat. No. 3,722,560.

[52] U.S. Cl. .............................................. 222/276
[51] Int. Cl. ........................................... G01f 11/02
[58] Field of Search ................... 222/266, 275, 276, 222/334, 249, 267, 277, 265; 417/487, 531, 515

[56] References Cited
UNITED STATES PATENTS

| | | | |
|---|---|---|---|
| 1,685,460 | 9/1928 | Myers et al. | 222/276 |
| 3,193,156 | 7/1965 | Egee et al. | 222/276 X |
| 3,328,937 | 7/1967 | Newman et al. | 222/334 X |
| 1,931,975 | 10/1933 | Berzon | 222/276 |

Primary Examiner—Stanley H. Tollberg
Attorney—Faye, Sharpe & Mulholland

[57] ABSTRACT

A dispensing apparatus and conveyor particularly suitable for use in bakeries for depositing fillings and the like into or on bakery products, or for supplying batter to pans. The apparatus broadly includes a combined dispensing head means and conveyor means which are actuated in timed relationship. The dispensing head means is located at a first position and arranged for discharging predetermined quantities of fluent material in a downward direction. The conveyor means passes beneath the dispensing head means and functions to move material receiving surfaces or products past the head means. At least one section of the conveyor extends generally horizontally under the depositing head means. Additionally, the conveyor section is provided with power means adapted to reciprocate it vertically upward toward the dispensing head means. Control means are interrelated between the reciprocating conveyor section and the dispensing head section so that the dispensing head functions while the material receiving surfaces are being, or have been, raised by the reciprocating conveyor section. The specification also discloses a dispensing head assembly adapted to dispense a plurality of discrete quantities of fluent material simultaneously. The assembly comprises first and second spaced plate members with the first member having a plurality of outlet orifices formed therethrough and the second plate member having a plurality of inlet orifices. A third plate member is positioned between the first and second plates for reciprocation relative thereto. The third plate member also has a plurality of openings formed through it and these openings define a plurality of closed, movable chambers. Positioned in each of the chambers is a piston or pusher member which divides the chambers into first and second chamber portions. The piston members and the third plate member are connected with actuating means adapted to simultaneously move all of the first and second chamber portions to alternately connect them with selected inlet and outlet orifices. Further, second actuating means are provided for reciprocating the third plate member independently of the first actuating means and the pusher members so that the third plate can be moved intermediate the movements produced by the first actuating means.

11 Claims, 13 Drawing Figures

APPARATUS FOR DISPENSING A PLURALITY OF DISCRETE QUANTITIES OF FLUENT MATERIAL

This is a division, of application Ser. No. 128,805, filed 3/29/71 now U.S. Pat. No. 3,722,560.

The subject is directed toward the dispensing art and, more particularly, to an improved method and apparatus for simultaneously dispensing multiple quantities of fluent material into or on a body.

The invention is particularly suited for use in the baking industry for injecting fillings and jellies into or on cakes, rolls, or the like and will be described with particular reference thereto; however, as will become apparent, the invention is capable of broader application and could be used for dispensing many types of materials in many different environments.

One of the problems involved in the manufacture of the small cream filled "snack" type cakes has been the difficulties involved in injecting the cream fillings. In the typical bakery line, the pans used may hold 36 or more of the small cakes in closely spaced relationship. For example, one pan used has three rows of twelve cakes. The close spacing and large number per pan makes it extremely difficult to provide an apparatus which can fill a full pan at once or with only a minimum number of index movements.

In the past, the most common type of machine used for the filling operation has comprised an elongated manifold provided with a plurality of outlet nozzles or needles. Normally, the number of nozzles provided equaled the number of cakes per pan row. Thus, only those cakes in one row could be filled simultaneously. In addition to the obvious drawback of requiring each pan to be indexed a number of times equal to the number of rows of cakes thereon, the apparatus had other more serious disadvantages.

Although some dispensing manifolds could fill an entire pan, these generally had a large number of outlets per piston. Even with this type, there were serious disadvantages.

The most serious disadvantage was the difficulty of obtaining uniform discharge through all nozzles. Slight variations in pressure drop through the nozzles and differences in supply pressure could cause substantial variations in the quantities of material supplied through individual nozzles. Thus, certain of the cakes were overfilled while others were underfilled. At times, some of the nozzles would become plugged, resulting in certain cakes receiving no filling and others being ruptured from overfilling.

The variations in filling could have further disadvantages. In many cakes, the cake batter is controlled to take into consideration the amount of moisture contained in the filling. Underfilling thus results in the cake being overly dry. Consequently, the customer gets an extremely bad tasting product.

In addition to the problems with variations in filling, the prior apparatus was slow since it was necessary to continually index each pan a number of times equal to the number of rows of cakes. Further, with each index of the pan, the manifold had to be reciprocated down to push the nozzles or outlet needles into the cakes. This substantially complicated the manifold support structure.

The subject invention overcomes the above problems and provides a dispensing or filling system which is capable of simultaneously filling substantially any number of cakes or the like with closely controlled quantities of material. The inventive system or apparatus is extremely simple and rapid in operation and allows close control and/or variation in the quantities dispensed. In general, in accordance with one aspect of the invention, the apparatus broadly includes a combined dispensing head means and conveyor means which are actuated in timed relationship. The dispensing head means is located at a first position and arranged for discharging predetermined quantities of fluent material in a downward direction. The conveyor means passes beneath the dispensing head means and functions to move material receiving surfaces or products past the head means. At least one section of the conveyor extends generally horizontally under the depositing head means. Additionally, the conveyor section is provided with power means adapted to reciprocate it vertically upward toward the dispensing head means. Control means are interrelated between the reciprocating conveyor section and the dispensing head section so that the dispensing head functions while the material receiving surfaces are being, or have been raised by the reciprocating conveyor section. As is apparent, this combination and relationship allows the dispensing head to remain stationary and only the pan and material receiving members to undergo movement. Thus, the dispensing head can be as large as required and no special mounting or moving devices need to be provided.

In accordance with another aspect, the invention provides an improved dispensing head assembly adapted to dispense a plurality of discrete quantities of fluent material simultaneously. The assembly comprises first and second spaced plate members with the first member having a plurality of outlet orifices formed therethrough and the second plate member having a plurality of inlet orifices. A third plate member is positioned between the first and second plates for reciprocation relative thereto. The third plate member also has a plurality of openings formed through it and these openings define a plurality of closed, movable chambers. Positioned in each of the chambers is a piston or pusher member which divides the chambers into first and second chamber portions. The piston members and the third plate member are connected with actuating means adapted to simultaneously move all of the first and second chamber portions to alternately connect them with selected inlet and outlet orifices. Further, second actuating means are provided for reciprocating the third plate member independently of the first actuating means and the pusher members so that the third plate can be moved between the movements produced by the first actuating means.

The dispensing head provided is extremely simple to construct and provides positive displacement of the material in the individual chambers. By controlling the stroke of the third plate member, it is possible to simultaneously adjust the quantities dispensed. Moreover, the apparatus provides positive displacement of the material in the chambers so that it is not possible to have any substantial pressure variations between the outlets. This is a distinct advantage over the prior art manifold method and over any type of system which uses an individual supply pump for each dispensed quantity. Note that the inlet and outlet openings and the plate openings are arranged so as to provide a valving function so that individual valves are not required for each of the chambers. Thus, the entire arrangement functions as a multiplicity of individual dispensing pumps and can be made from only four separate elements, only two of which must be moved in timed relationship.

In accordance with a further aspect, the dispensing head is provided with a plurality of spaced downwardly extending discharge nozzles connected to the outlet orifices. Additionally, a conveyor is arranged to pass under the discharge head and is provided with a vertically reciprocal section which can move the material receiving members up to proper relationship with the individual nozzles in timed relationship with the dispensing operation. This greatly facilitates filling operations since the product being filled is moved directly to the nozzles and the movement of both the conveyor means and the dispensing head can be closely controlled.

Accordingly, a primary object of the invention is the provision of an improved conveyor and dispensing head assembly which is particularly suited for filling small snack or lunch box type cakes and bakery products or, alternately, for dispensing predetermined quantities of toppings, or the like, onto such products.

Yet another object of the invention is the provision of an improved dispensing head assembly which provides for positive displacement of a large number of closely controlled quantities of fluent material with a minimum number of moving parts.

Yet another object is the provision of an apparatus of the general type described which is extremely simple to construct and operate.

Yet another object of the invention is the provision of a dispensing apparatus which, in effect, provides a large number of positive displacement pumps and requires only two moving parts to perform all pumping and valving functions required.

Yet another object is the provision of a conveyor particularly suited for use in the dispensing art; which conveyor has a section adapted to reciprocate vertically relative to feed and discharge sections connected thereto.

The above and other objects and advantages will become apparent from the following description when read in conjunction with the accompanying drawings wherein.

Figure 4:
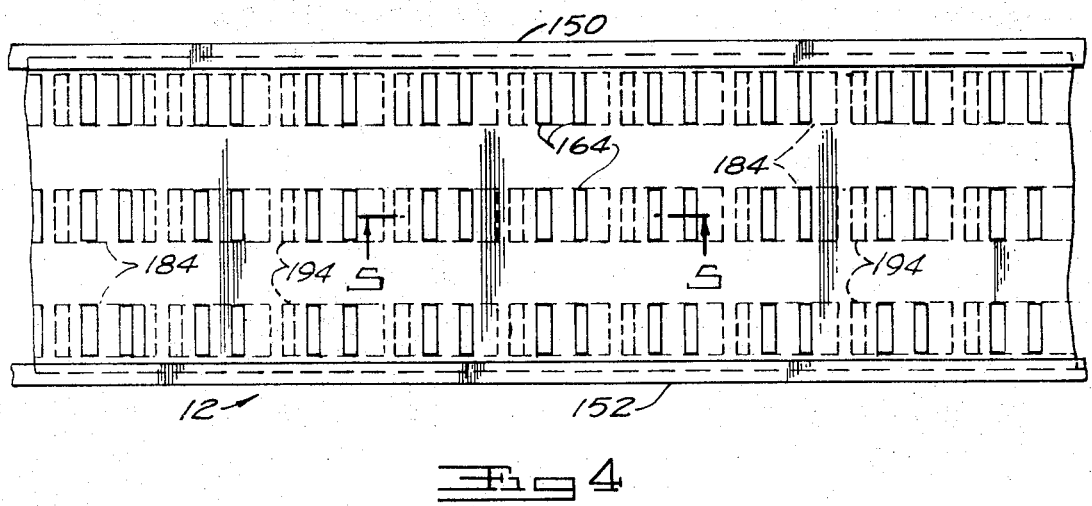
FIG. 4 is a partial plan view taken on line 4—4 of FIG. 3.
Figure 11:
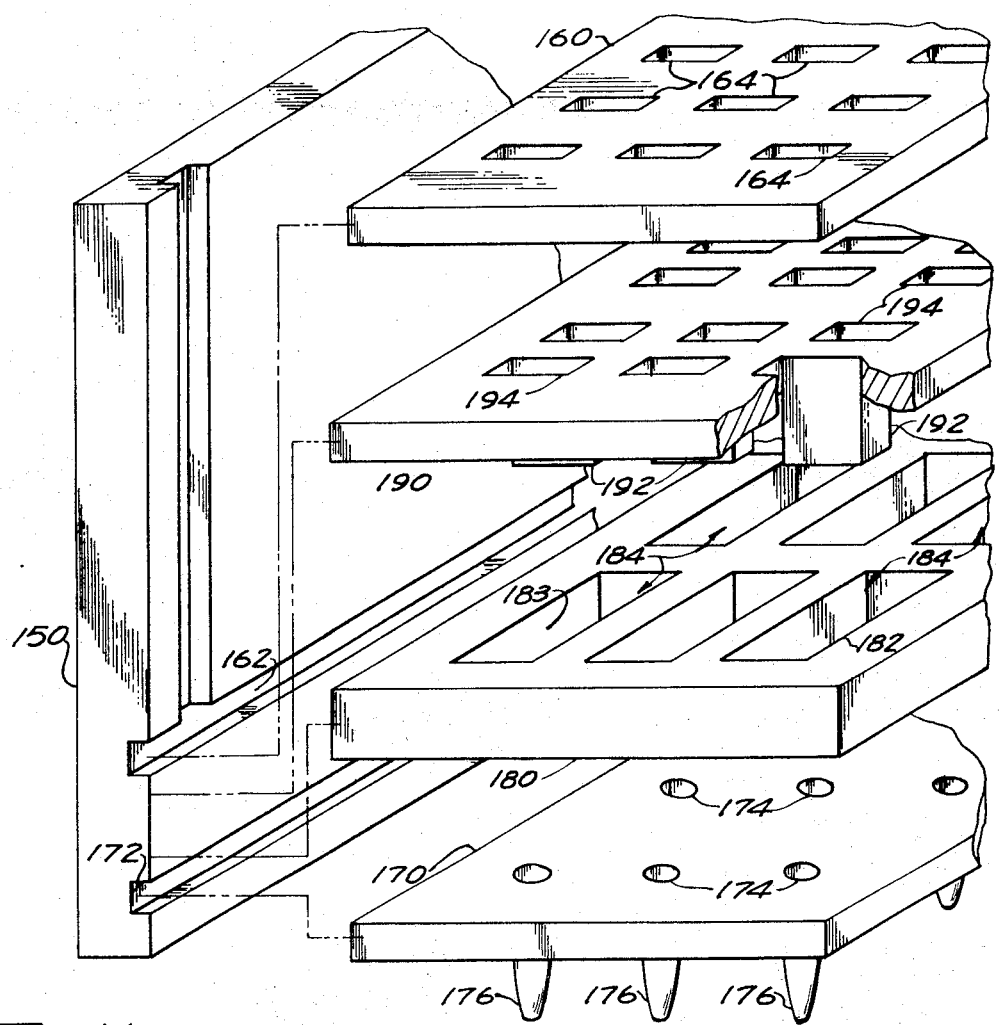
Figure 12:
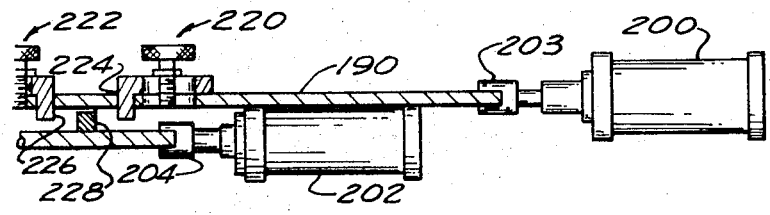
Figure 13:
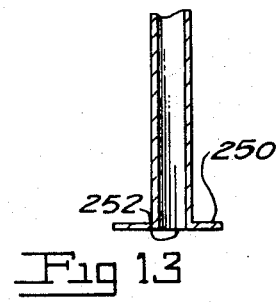

FIGS. 5 through 10 are cross-sectional views, somewhat diagramatic, illustrating the sequence of operations taking place during a full dispensing cycle in the head (the FIGS. 5 through 10 illustrate the movement of the components on line 5—5 of FIG. 4);

FIG. 11 is an exploded, partial pictorial view of the dispensing head assembly;

FIG. 12 is an enlarged view showing the adjusting means which permit rapid variation in the quantities of the material dispensed; and, FIG. 13 shows a modified form of dispensing needle which can be used for dispensing materials onto the bakery products rather than dispensing it into the products.

Figure 1:
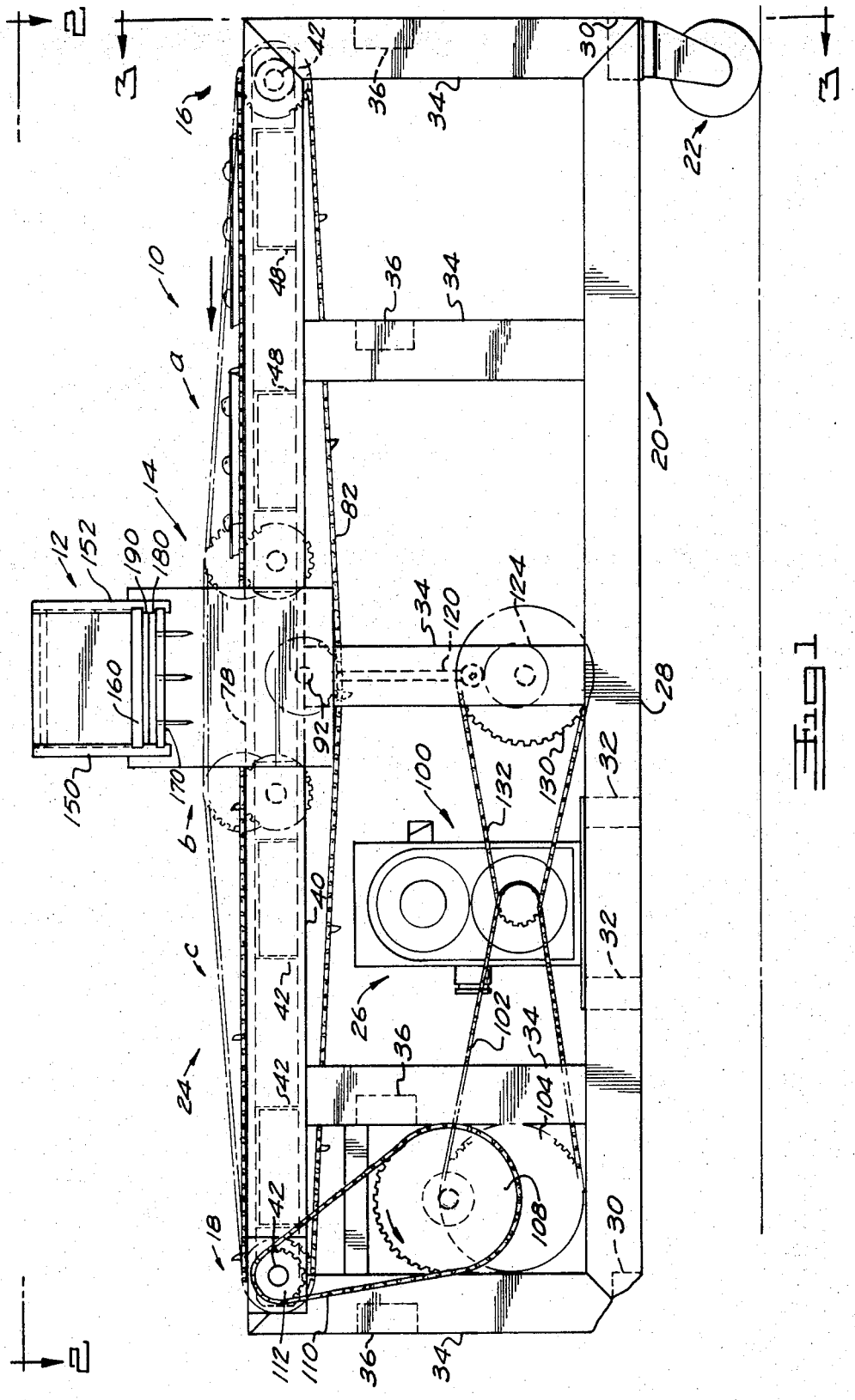
FIG. 1 is a side elevation of a dispensing head and conveyor assembly formed in accordance with the preferred embodiment of the invention.

Referring now to the drawings wherein the showings are for the purpose of illustrating the preferred embodiment of the invention only and not for the purpose of limiting same, FIG. 1 is a front elevation showing the overall arrangement of a dispensing system formed in accordance with a preferred embodiment of the invention and comprising a conveyor assembly 10 and a dispensing head assembly 12 located at a work station 14 generally at the mid-point of conveyor 10. The conveyor 10 is arranged to convey pans 11 of small cakes or the like from an inlet end 16 to an outlet end 18. The pans are moved along the length of the conveyor in a step-by-step index movement. When a pan is at the work station 14, the conveyor is adapted to reciprocate the pan upwardly to an elevation suitable for receiving the filling or other fluent material from the dispensing head assembly 12.

THE CONVEYOR ASSEMBLY 10

The structural details of the conveyor 10 could vary substantially from that shown in the drawings; however, in the preferred embodiment, conveyor assembly 10 includes an elongated frame 20 provided with casters or wheel assemblies 22 which allow it to be moved about the plant to different lines, if desired.

Carried by the frame assembly 20 is an endless conveyor chain means 24 which will subsequently be described in greater detail. The chain conveyor means 24 is driven in step-by-step index movement by a drive and power means assembly 26 also carried from the frame 20. The drive and power means assembly 26 will also be subsequently described in greater detail.

THE FRAME ASSEMBLY 20

In the embodiment under consideration, frame assembly 20 is preferably formed from metal rectangular, tubular members interconnected in any suitable manner, such as by welding. Specifically, as best shown in FIG. 1, the base of frame 20 comprises a pair of parallel, horizontally extending side members 28 connected at their opposite ends by horizontally extending cross-brace members 30. Additional strength is provided for the base portion of the frame by transversely extending frame members 32 which also serve to support a portion of the drive and power means assembly 26.

Extending vertically upward from the members 28 are a plurality of side frame members 34 which support a top frame 36. The side frame members 34 at each end of the frame aseembly 20 are connected by cross-brace members 36 which are welded or otherwise joined to the side frame members.

The top frame assembly 36 merely comprises a pair of frame members 40 which are supported from the top of the side frame members 34 and extend the length of the conveyor frame.

The conveyor chain assembly 24 is supported from the two top frame members 40 at their opposite ends by transversly extending shafts 42, each pivotally mounted in suitable bearing assemblies 44. For reasons subsequently to be discussed, the bearing assemblies 44 are mounted so that they can have a slight horizontal shifting movement. This can be accomplished many ways, such as, for example, merely by providing small guideways for the bearing members.

THE CHAIN CONVEYOR ASSEMBLY 24

The chain conveyor assembly 24 comprises three sections *a*, *b* and *c*. The sections are interconnected in a manner subsequently to be described but arranged so that they can have certain degrees of relative movement. Section a comprises a pair of side plates 46 which are interconnected by large inverted channel-like members 48 (see FIG. 2). Members 46 and 48 provide a conveyor support table which carries a sheet metal top plate 50 which is removably positioned over members 48 and prevented from shifting laterally by downwardly extending edge flanges. The table for section a is supported at one end from the right-hand shaft 42. Note that as shown in FIG. 1, suitable bearing assemblies 52 are carried at the ends of side plates 46 and receive the shaft 42. This permits the support table to have pivoting movement about shaft 42. At its other ends, the support table for conveyor section a is similarly supported from a transversely extending shaft 54 by bearings 56.

The discharge section *c* of the chain conveyor assembly is constructed in generally the same manner as described with reference to section *a*. That is, the support table comprises a pair of side frame members 58 which extend generally longitudinally of the frame and are interconnected by inverted U-shaped channel or frame members 60. A cover plate or the like 62 is removably supported on the table frame and maintained thereon by flanged edges. The support table for section *c* is supported from the left-hand shaft 42 by suitable bearing assemblies 64 carried at the left-hand end of the side frame members 62. At the right-hand end of the side frame members 62, the table is supported from a horizontally extending shaft 66 which is rotatably mounted in the end bearings or bearing assemblies 68.

As previously mentioned, the center section *b* of the conveyor assembly is arranged to move vertically at timed relationship with the index movement of the conveyor chains. For this reason, section *b* is formed by a pair of side plate members 70 carried from an intermediate underframe 72 (see FIG. 3). The underframe 72 merely comprises a horizontal bar member 74 having vertically extending bar members 76 joined to its outer ends and extending upwardly to the side frame members 70. Referring again to FIG. 1, it should be noted that a cover plate 78 extends across the top of the side frame members 70 and is preferably removably positioned thereon.

Figure 2:
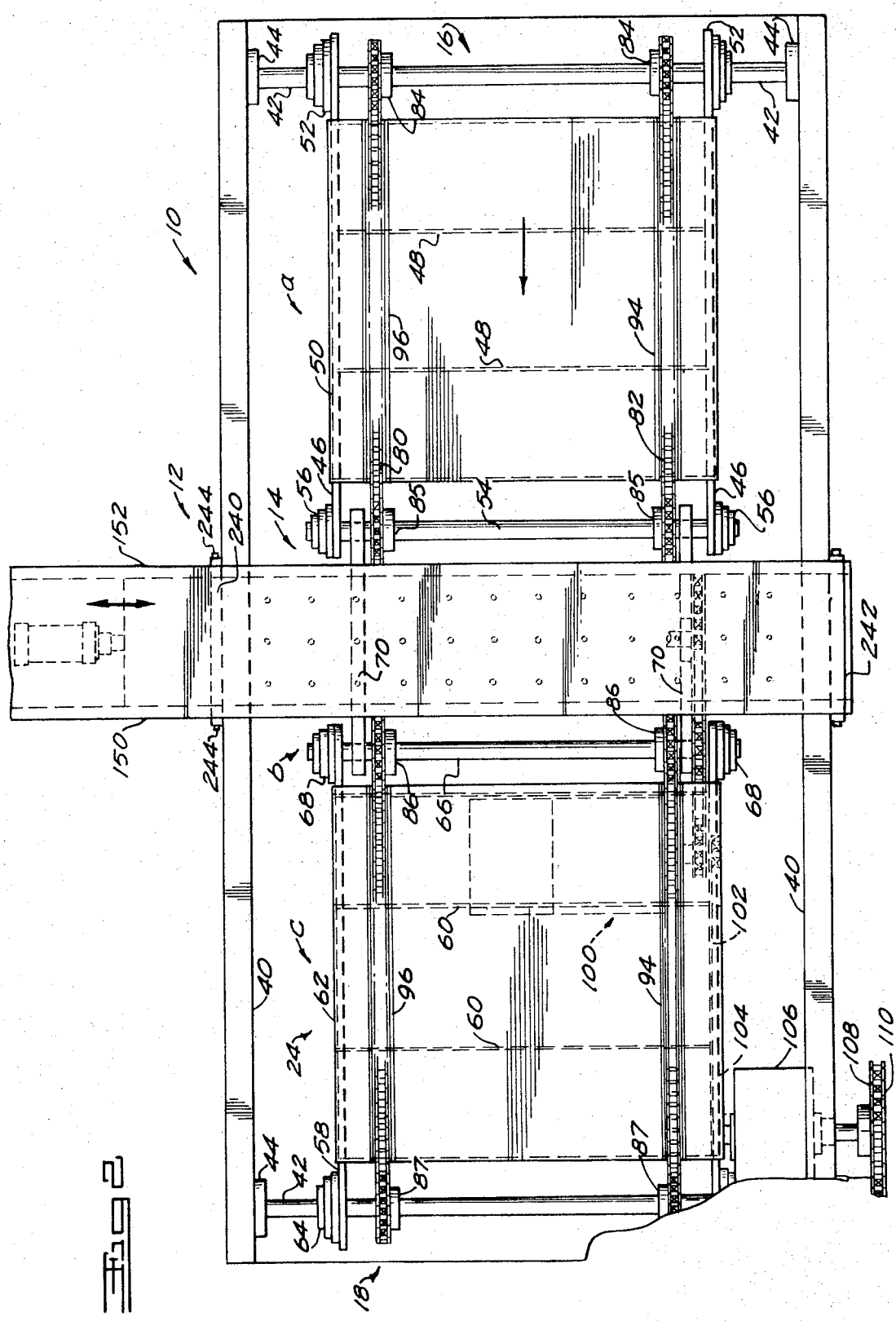
FIG. 2 is a plan view of the assembly shown in FIG. 1.

As best shown in FIG. 2, the horizontal side frame members 70 of the center section *b* carry the shafts 54 and 66.

As can be appreciated, the described arrangement provides a three-section conveyor support table in which the individual sections can have articulated movement relative to one another. Note that upon vertical movement of the center section *b*, the inlet and outlet sections *a* and *c* are tilted as shown in dotted lines in FIG. 1. Additionally, as can be appreciated, the shafts 42 at the outer ends of the sections *a* and *c* must move inwardly a slight amount, depending upon the degree to which the center section *b* is raised. For this reason, as previously mentioned, the bearing assemblies 44 are preferably arranged so that they can slide a short distance horizontally. For most installations, only a fraction of an inch of movement is required.

Figure 3:
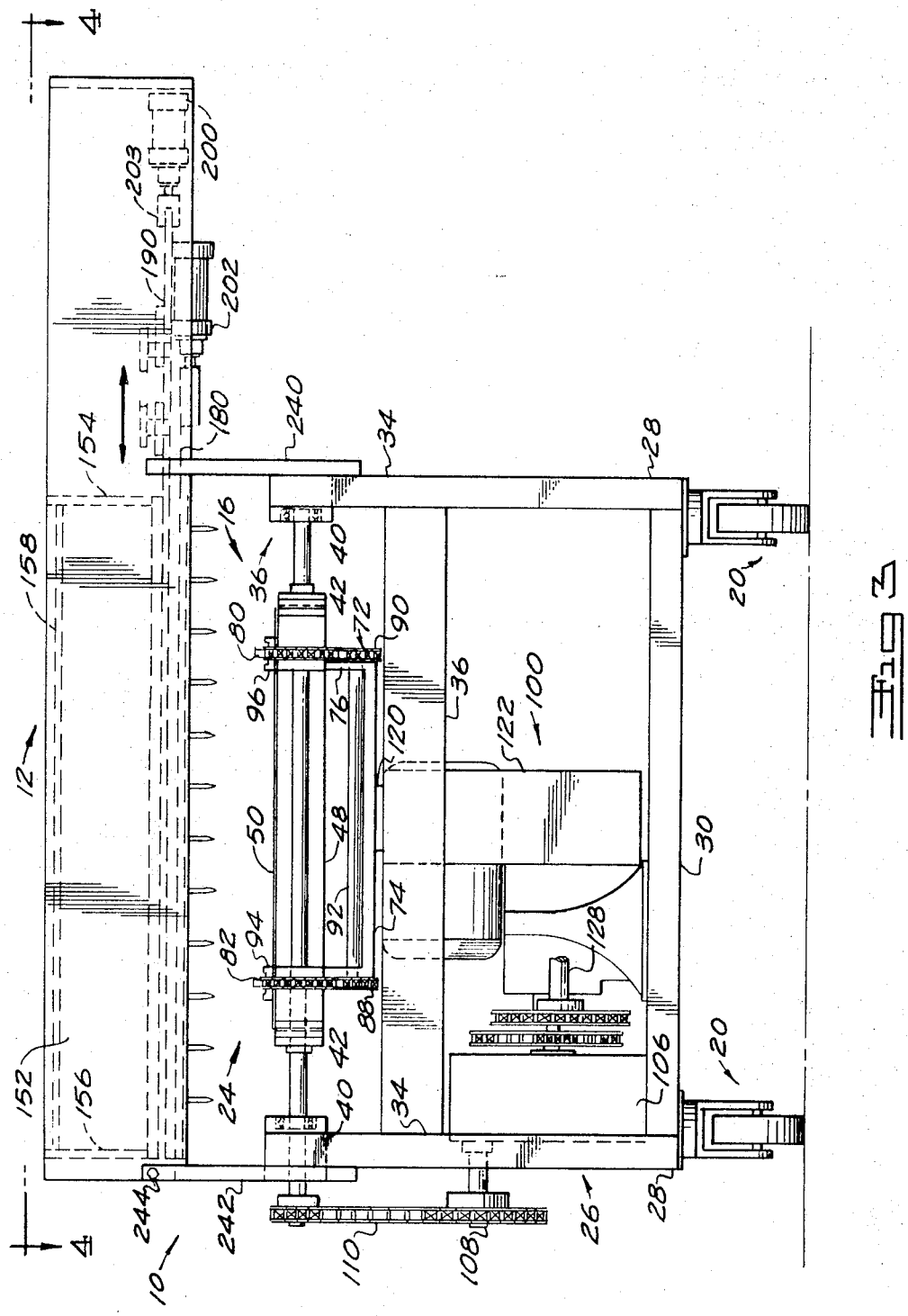
FIG. 3 is an end elevation of the FIG. 1 apparatus taken on line 3—3 of FIG. 1.

The actual conveying portion of the conveyor assembly 24 comprises a pair of conveyor chains 80 and 82 which are trained about all three sections *a*, *b* and *c*. As best shown in FIGS. 2 and 3, the chains travel about suitable sets of sprockets 84, 85, 86 and 87 carried on shafts 42, 54, 66 and 42, respectively. Additionally, as shown in FIGS. 1 and 3, an additional set of sprockets 88 and 90 are carried to engage the lower run of the chains. The sprockets 88 and 90 are carried by a horizontal shaft 92 which extends through suitable bearings in the underframe members 76 of the center conveyor table section *b*.

The conveyor chains 80 and 82 are guided in their movement over the conveyor table sections by suitable guide members 94 and 96 which are joined in sections to the removable top plate members 50, 78 and 62, respectively. The guideway channels merely serve to prevent any undue lateral movement of the upper runs of the chains.

THE DRIVE AND POWER MEANS ASSEMBLY 26

The power means for the conveyor comprises an electric motor and gear reducer unit 100 which is positioned generally at the lateral center on the cross-frame members 32. The output shaft of the motor and gear reducer unit 100 is connected through a drive chain 102 with an input sprocket 104 of a Geneva drive 106. As is well known, a Geneva mechanism produces an indexed rotary output movement from a continuous rotary input. In the subject embodiment, the output sprocket 108 from the Geneva mechanism 106 makes a predetermined number of discrete movements for a predetermined number of revolutions of the input sprocket 104. The output sprocket 108 is connected through a chain 110 with a smaller sprocket 112 connected to the outer end of the horizontal shaft 42. Thus, constant rotational output from the motor and gear reducer unit 100 results in indexed, step-by-step movement of the conveyor chains 80 and 82 from e input end 16 to the output end 18 of the conveyor.

As previously mentioned, the vertical reciprocation of the intermediate conveyor section *b* must take place in timed relationship with the index movements of the conveyor chains. As will be appreciated, the vertical reciprocation must preferably take place at the time the conveyor chains are stopped and a pan of cakes, or the like, are located at the work station 14. For this reason, means are provided to reciprocate the intermediate conveyor section *b* from the solid line position to the dotted line position (as shown in FIG. 1). The means for the necessary reciprocation could take many forms but, in the subject embodiment, comprise a vertically extending shaft 120 (see FIG. 1) carried in a vertical guideway (not shown) supported between the center side frame members 34. The shaft or bar 120 is shown in FIG. 3 and slides vertically in the guideway forming housing 122. The vertical movement is produced by a drum cam member 124 which is mounted in the lower end of the housing 122. The drum cam 124 is driven by the motor and gear reducer unit 100 through a shaft 128 which extends outwardly from housing 122 and is drivingly connected with the output shaft of the motor and gear reducer unit through a sprocket 130 and a chain 132. The cam and the sprockets are arranged so that with each index movement of the chain, the center conveyor section *b* is reciprocated up to the proper relationship with the dispensing head assembly 12 and thereafter returned to the horizontal position for the next indexing movement.

Thus, as can be appreciated, the entire indexing and vertical movement of the conveyor takes place automatically in the proper timed relationship.

DISPENSING HEAD ASSEMBLY 12

One aspect of particular importance to the overall system is the dispensing head assembly 12 which is arranged to simultaneously deposit a large number of closely controlled quantities of fluent material into or on the bakery products being conveyed thereunder. According to this aspect of the invention, substantially any number of deposits can be made simultaneously in closely controllable quantities. In the structural embodiment under consideration, the head assembly is arranged to simultaneously dispense 36 quantities of fluent material at once. Specifically, the assembly is arranged to dispense three rows of 12 each to completely fill all of the snack cakes on a single pan 11.

The preferred embodiment of the dispensing head assembly 12 can best be understood by reference to FIGS. 1, 2 and 11. As shown, the assembly includes a pair of spaced side plates 150 and 152 which extend transversely across the conveyor, as best shown in FIGS. 2 and 3. Extending transversely between the side plates 150 and 152 are plates 154 and 156 (see FIG. 3) which define the ends of the material holding portion of the assembly. A removable cover member 158 extends between the two end plates 156 and 154 and across the unit between the side plates 152 and 150.

Positioned in the lower portion of the chamber defined by the side plates and the end plates is a valving and dispensing unit best understood by reference to FIGS. 4 and 11. As shown in FIG. 11, the valving and dispensing assembly comprises a first plate member 160 which is fixedly mounted between the side plates 150 and 152 by having its lateral edges carried in grooves or slots 162 formed in each of the side plates. The plate 160 is provided with three rows of openings 164 which extend vertically through the plate 160. As will be explained more fully hereafter, the number of openings 164 provided is normally equal to two times the number of quantities which the unit is required to discharge. The openings 164 serve as inlet openings to the valving and dispensing portion of the assembly and allow material, such as the required fillings, toppings, or the like, held within the upper portion of the chamber to be fed through to the valving and discharge portion. Spaced from the plate 160 is a second discharge plate 170 which is fixedly mounted between the side plates 150 and 152 by having its lateral edges received in the grooves 172. Plate 170 is provided with three rows of outlet openings 174 which correspond in number and arrangement to the number and placement of discharges required. The openings 174 are formed completely through the plate 170 and connect with discharge nozzle members 176 which serve to inject the filling material into the cakes.

Slidably mounted between the plates 160 and 170 are a second pair of plates 180 and 190. Plate 180 is provided with a series of elongated openings 182 which extend completely through the plate and define in combination with plates 170 and 190, a series of chambers 184. The number of openings 182 corresponds to the number of discharge openings 174.

Plate 190 is adapted to be closely but slidably received between the under surface of plate 160 and the upper surface of plate 180. As shown in FIG. 11, plate 190 is provided with a series of downwardly extending fingers or pusher members 192. Openings are formed through the plate 190 at opposite sides of each of the fingers or pushers 192. The openings 194 are preferably of a width substantially equal to the width of openings 164 and of a length generally corresponding to the width of the openings 182. The pusher members 192 are sized so as to be closely but slidably received between the side walls 183 of the openings 182. Their length is such that they slidably engage the top surface of plate 170 when the various plates are properly assembled.

The spacing for the various openings through plates 160, 170, 180 and 190 is relatively critical and can best be understood by reference to FIG. 5 through 10 which illustrate the operation of the dispensing assembly. However, before describing the functioning of the dispensing unit itself, reference should be made to the actuating means used for moving the plates 180 and 190. Although these means could take many forms, they preferably comprise a pair of air cylinders 200 and 202 carried at the right-hand end of the assembly. The air cylinders 200 and 202 are each double acting and it should be noted that cylinder 200 is connected to end plate 201 and has its piston rod connected through a clevis 203 directly to an extension of plate 190. The extension portion 190 does not, of course, have to have the openings 194 formed therethrough. Carried from the under side of the extension on plate 190 is the double acting air cylinder 202. The piston rod of cylinder 202 is directly connected to the plate 180 by a releasable clevis member 204.

As can be appreciated, operation of the double acting air cylinder 200 to reciprocate plate 190 causes simultaneous reciprocation of air cylinder 202 and plate 180. The movement of plate 180 produced by operation of air cylinder 200 thus causes simultaneous and equal movement of plates 180 and 190. However, actuation of air cylinder 202 produces movement only of plate 180.

OPERATION OF THE DISPENSING HEAD

Referring to FIGS. 5 through 10, the operational sequence of the dispensing head assembly is shown somewhat diagramatically. Note that the cross-sectional views of FIGS. 5 through 10 represent a series of operations taking place in two of the dispensing chambers 184.

To aid in understanding of the operation, the element of the FIGS. 5 through 10 showing have been given the same reference numerals as they have in the other figures. However, because there are a plurality of openings and the like, the openings illustrated in the showings of FIGS. 5 through 10 have differentiated from one another by the addition of letter suffixes.

Figure 5:
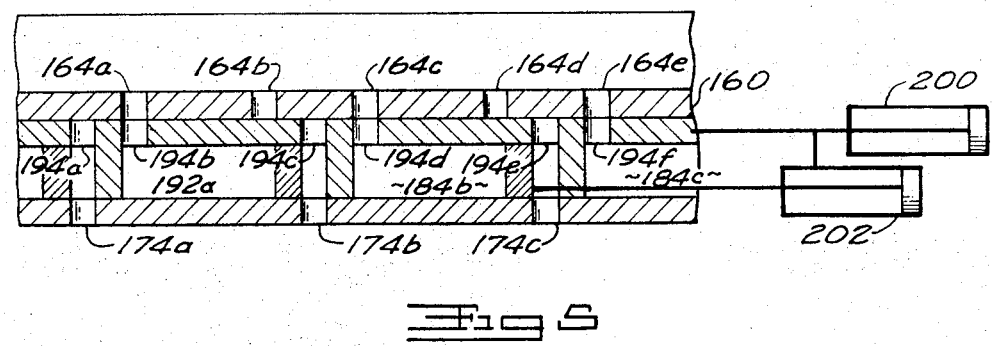

Starting with FIG. 5, the various plates are shown in their assembled relationship with the double acting air cylinders 200 and 202 in their fully retracted positions. At this time, inlet openings from the material holding portion of the head are aligned with openings through the plate 190 to provide communication with the chambers 184a, 184b and 184c. Note that openings 164a, 164c and 164e are aligned with th openings 194b, 194d and 194f, respectively. The remaining openings 164b and 164d are sealed off by the surface of plate 190. Similarly, openings 194a, 194c and 194e are sealed by the under surface of plate 160. At this time, the right-hand sections of chambers 184a, 184b and 184c are filled with material from the material holding section of the head assembly.

Figure 6:
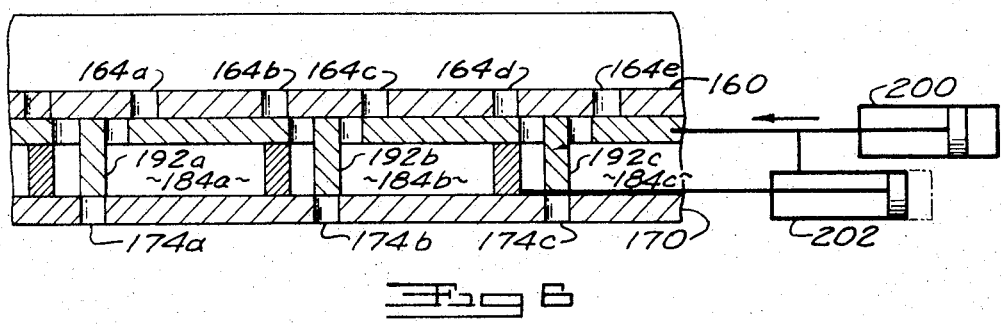

While the conveyor is moving a pan into position at the work station 14, the cylinder 200 is operated, shifting both plate 180 and 190 to the left. FIG. 6 illustrates the movement at an intermediate point to the left. Note that the spacing between the pushers 192 and the corresponding right-hand end wall of the chambers 184, remains constant and the material within these chambers is moved to the left. The openings 164 and 194 move out of alignment and are sealed by the adjacent surfaces of plates 160 and 190.

Figure 7:
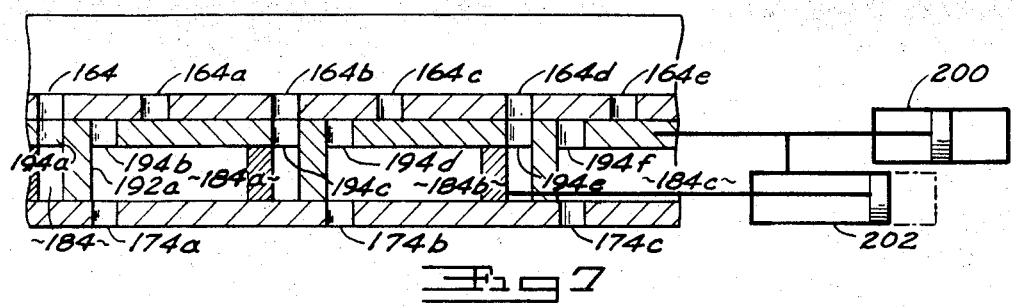

FIG. 7 illustrates the total extent of left-hand movement for cylinder 200. At this time, the openings 164, 164b and 164d are brought into communication with the right-hand sections of the chambers 184, 184a and 184b, respectively. Similarly, the right-hand sections of these chambers are brought into communication with the discharge openings 174a, 174b and 174c. At this time, actuation of cylinder 202 to the left causes the plate 180 to be driven to the left, as illustrated in FIG. 8.

Figure 8:
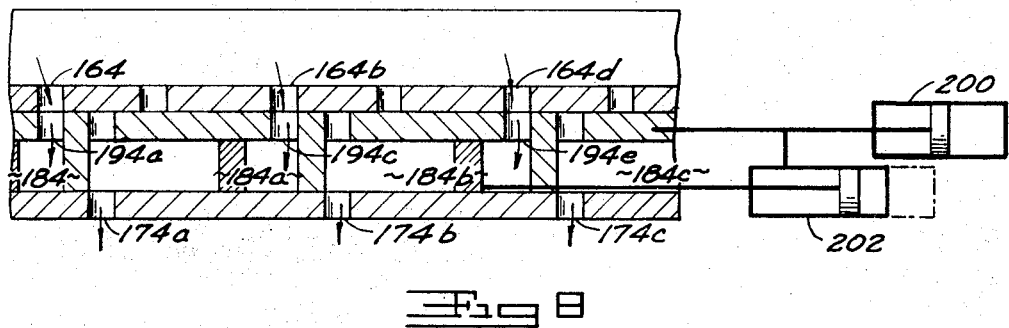
Figure 9:
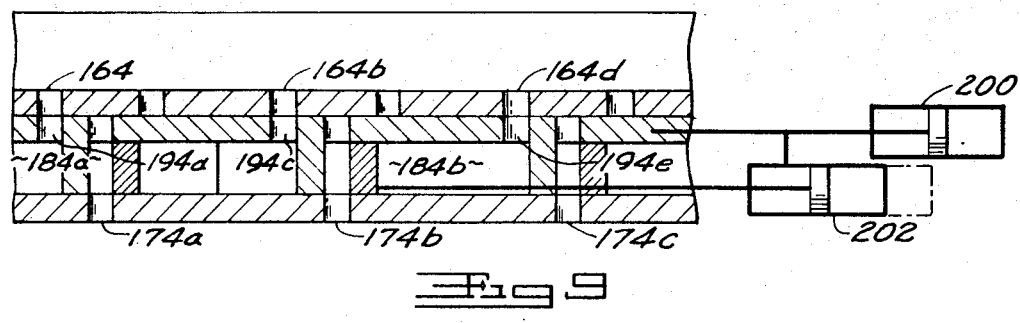

FIG. 8 shows the cylinder 202 part way to the left in its total path of movement. Note that during movement to the left, material from the storage portion of the assembly is drawn into the right-hand sections of the chambers 184, 184a and 184b through the aligned openings 164 and 194a, 164b and 194c, 164d and 194e. Simultaneously, the material in the left-hand sections of chambers 184a, 184b and 184c is discharged through outlet openings 174a, 174b and 174c, respectively. Movement of cylinder 202 continues to the left until the pusher members 192 have shifted to the dotted line position. At this time, the material within the left-hand section in each of the chambers has been discharged downwardly through the nozzles and into the cakes whereas the right-hand sections of the corresponding chambers have been filled with material from the storage section. FIG. 9 shows the total extent of leftward movement of both of the cylinders at the completion of the discharge from the left-hand sections of the chambers 184.

Figure 10:
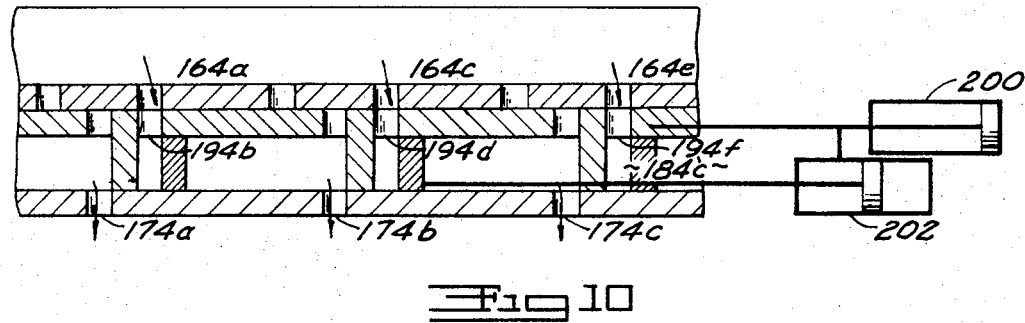

Following the total movement to the left of cylinder 202, cylinder 200 is actuated to shift both plates 180 and 190 back to the right to the position illustrated in FIG. 10. Thereafter, actuation of cylinder 202 to the right causes the material in the right-hand section of each of the chambers 184, 184a and 184b to be discharged through the nozzles 174a, 174b and 174c, respectively. Simultaneously, the left-hand sections of the chambers are being filled with material from the hopper. At this time, the cylinders and components are in the position illustrated in FIG. 5 and the complete cycle of operations can begin again.

As can be appreciated from the foregoing description, the quantities of materials dispensed from the individual chambers is identical and it is not possible for any one chamber to be discharging more than one of the other chambers. The only possible way this could happen would be if one of the inlet openings became plugged and material were prevented from being drawn into the chamber. A nozzle plugged by cake particles or the like could not affect the quantity discharged since there is a positive discharge and particles in the nozzles would be blown out.

It should be appreciated that many different types of mechanical or electrical actuating or power means could be used for shifting the plates at the required time. The use of air cylinders is preferred since it can be extremely simple and since adjustment of the quantity dispensed is possible.

FIG. 12 illustrates one manner in which the quantity dispensed can be rapidly varied. Note that a pair of stop members 220 and 222 are carried from the top surface of plate extension 190 and are provided with fingers 224 and 226, respectively, which extend downwardly through elongated slots in the plate. The position of the fingers 226 limits the total movement stroke of the cylinder 202 by virtue of an upwardly extending stop member 228 carried from the piston rod. Adjustment of the position of the stop members is provided by hand wheels and threaded shafts which extend downwardly through elongated slots in the body of the stop members into tapped openings in the plate. By releasing the shafts, the position of the stop plates can be adjusted to limit the total stroke of cylinder 202.

Many different variations could be made in the preferred embodiment without departing from the invention. For example, the dispensing head itself could be made up in multiple sections, each operated by different sets of air cylinders or any other type of actuating devices. Further, other types of conveyors could be used in conjunction with the dispensing head or the materials to be filled or deposited on could be manually positioned under the dispensing head.

Referring again to FIGS. 1 and 3 of the drawings, it will be seen that in the subject embodiment, the dispensing head is mounted directly from the conveyor by vertically extending frame members 240 and 242 which are welded or otherwise positively joined to the side frame members 40 and releasably connected to the dispensing head assembly by machine screws or the like 244. This arrangement allows the dispensing head to be rapidly removed from the conveyor and transferred to other conveyors or to allow the conveyor to be used for other functions.

One important advantage of the described dispensing head assembly is that the particular plate type arrangement provided facilitates removal of the plates for cleaning or replacement to provide different numbers of outlets, or the like. Note that merely by releasing the two clevis members and removing the stop adjustment members, the entire valving and discharge assembly can be withdrawn from the left-hand end of the head assembly. The two fixed position plates are, for this reason, preferably removably held in the grooves by the end plates.

FIG. 13 illustrates a modified form of discharge nozzle member which can be used in the device. Note that the nozzle member of FIG. 13 is provided with an enlarged lower end 250 and a center discharge outlet 252. The arrangement of the enlarged lower end 250 prevents it from penetrating the bakery products and allows the material to be deposited directly to the top of the product. Normally, this type of nozzle would be used on fresh dough pieces and by adjusting the position of the head or the amount of vertical movement of the conveyor, it is possible to cause the enlarged portion 250 to depress the center of a dough piece so as to provide a pocket or recess into which the topping will be deposited.

Although the device has been illustrated with a hopper or storage chamber built into the dispensing head, it is to be appreciated that this portion of the dispensing head could be made extremely small, if desired. For example, a continuous supply pump and line could be installed to feed the fluent material to the hopper. Alternately, a large hopper could be added, if desired.

Preferably, the hopper is maintained under a slight positive pressure, for example, five to ten psi so as to assure complete filling of the individual dispensing chambers 184 even when the batter or materials being dispensed is extremely thick and heavy and does not flow readily. Further, it should be appreciated that the exact configuration and layout of the dispensing nozzles can be varied and, for example, each of the individual outlet orifices 174 could be connected to two or more nozzles. The multiple nozzle arrangement per outlet opening is less desirable, however, since there could be variations in quantities supplied through the multiple nozzles even though the total quantity supplied from the individual chambers would remain constant.

Further, it should be understood that the invention is not to be construed as limited only to dispensing of fillings or toppings. For example, when used in the baking industry, it could be used for filling cupcake pans with batter or for other types of dispensing operations. Additionally, it should be understood that by replacing the plates 160, 170, 180 and 190, different quantities, patterns and the like can be dispensed.

Having thus described our invention, we claim:

1. An apparatus for simultaneously dispensing a plurality of discrete quantities of fluent material comprising:
   a first plate member having a plurality of outlet orifices formed therethrough;
   a second plate member spaced from said first plate member and having a plurality of inlet orifices formed therethrough;
   a third plate member positioned between said first and second plates for reciprocation relative thereto and having a plurality of openings formed therethrough;
   said openings in combination with said plates defining a plurality of closed, movable chambers;
   each of said chambers having a piston member carried therein and dividing each of said chambers into first and second chamber portions;
   first actuating means for reciprocating said third plate and said piston members simultaneously to alternately connect said first and second chamber portions with inlet and outlet orifices; and,
   second actuating means for reciprocating all of said piston members independently of said third plate member.

2. The apparatus of claim 1 wherein all of said pistons are connected to a common actuating member.

3. The apparatus as defined in claim 1 wherein said first actuating means includes a portion connected to the second actuating means whereby movement of said first actuating means produces movement of said second actuating means.

4. The apparatus as defined in claim 3 wherein said piston members are carried on a fourth plate member mounted for reciprocation between said first and second plate members and adjacent said third plate member.

5. The apparatus as defined in claim 1 wherein each of said openings is of approximately the same size and provided with at least one pair of parallel side walls between which said piston members extend.

6. The apparatus as defined in claim 1 wherein said first and second plates are removably mounted between a pair of parallel side walls; and,
   wherein the edges of said third plate member slidably engage the side walls.

7. A dispensing apparatus for discharging a plurality of discrete quantities of fluent material comprising:
   a housing including spaced upper and lower walls;
   a plurality of inlet orifices formed through said upper wall and a plurality of outlet orifices formed through said lower wall;
   a first reciprocable member carried between said upper and lower walls, said first member having a plurality of vertically extending openings which in combination with said housing define a plurality of reciprocable chambers;
   piston members positioned in each of said chambers and dividing each said chamber into first and second portions; and,
   first actuating means for moving said first member and said piston members simultaneously, and second actuating means for moving said piston members relative to said first member, said first and second actuating means including means for controlling their operation to alternately align both said first and second chamber portions with inlet and outlet orifices.

8. The dispensing apparatus as defined in claim 7 wherein said piston members are carried on a common actuating member positioned between said first member and said housing.

9. The dispensing apparatus as defined in claim 7 wherein said first member comprises a plate member and wherein said vertically extending openings are aligned in equally spaced rows.

10. The dispensing apparatus as defined in claim 7 wherein said first and second actuating means comprise fluid cylinder means.

11. A dispensing apparatus for discharging a plurality of discrete quantities of fluent material comprising:
    a housing including spaced upper and lower walls;
    a plurality of inlet orifices formed through said upper wall and a plurality of outlet orifices formed through said lower wall;
    a first reciprocable member carried between said upper and lower walls, said first member having a plurality of vertically extending openings which in combination with said housing define a plurality of reciprocable chambers;
    piston members positioned in each of said chambers and dividing each said chamber into first and second portions; and,
    first actuating means for moving said first member and said piston members simultaneously, and second actuating means for moving said piston members relative to said first member, said first and second actuating means comprising fluid cylinder means and wherein said fluid cylinder means includes at least two separately actuable cylinders with one cylinder arranged to reciprocate said pistons and the second arranged to actuate the first member and simultaneously move said first cylinder.

* * * * *

UNITED STATES PATENT OFFICE
CERTIFICATE OF CORRECTION

Patent No. 3,760,989        Dated September 25, 1973

Inventor(s) Richard L. Morine et al.

It is certified that error appears in the above-identified patent and that said Letters Patent are hereby corrected as shown below:

On the cover sheet insert the following:

-- [73] Assignee: Fedco, Inc., Mentor, Ohio --.

On the cover sheet under item [56] "Attorney- Faye, Sharpe and Mulholland" should read -- Fay, Sharpe and Mulholland --.

Column 1, line 5, after "subject" insert -- invention --.

Column 5, line 16, "ends" should read -- end --.

Column 6, line 36, "e" should read -- the --.

Signed and sealed this 26th day of March 1974.

(SEAL)
Attest:

EDWARD M. FLETCHER, JR.
Attesting Officer

C. MARSHALL DANN
Commissioner of Patents